US008686853B2

(12) United States Patent
Pfuhl

(10) Patent No.: US 8,686,853 B2
(45) Date of Patent: Apr. 1, 2014

(54) SYSTEM AND METHOD FOR GROUP SEARCH-BASED LOST BAG SEARCH AND RECOVERY

(76) Inventor: Richard Edward Pfuhl, San Francisco, CA (US)

(*) Notice: Subject to any disclaimer, the term of this patent is extended or adjusted under 35 U.S.C. 154(b) by 165 days.

(21) Appl. No.: 13/333,977

(22) Filed: Dec. 21, 2011

(65) Prior Publication Data
US 2013/0162429 A1 Jun. 27, 2013

(51) Int. Cl.
*G08B 1/08* (2006.01)
(52) U.S. Cl.
USPC ............... 340/539.13; 340/568.1; 340/10.1
(58) Field of Classification Search
USPC ........ 340/539.13, 572.1–572.9, 568.1, 539.1, 340/5.7, 10.1, 539.11, 573.1
See application file for complete search history.

(56) References Cited

U.S. PATENT DOCUMENTS

| | | | | |
|---|---|---|---|---|
| 5,348,347 A * | 9/1994 | Shink | | 281/31 |
| 6,088,651 A * | 7/2000 | Nageswaran | | 707/705 |
| 6,266,651 B1 * | 7/2001 | Woolston | | 705/26.3 |
| 7,243,845 B2 * | 7/2007 | Cash et al. | | 235/384 |
| 7,626,505 B2 * | 12/2009 | August et al. | | 340/572.4 |
| 7,845,569 B1 | 12/2010 | Warther et al. | | |
| 7,916,025 B2 | 3/2011 | Locker et al. | | |
| 7,938,323 B2 | 5/2011 | Wilke | | |
| 7,954,610 B2 | 6/2011 | Dayton et al. | | |
| 2002/0040928 A1 | 4/2002 | Jalili et al. | | |
| 2006/0055532 A1 * | 3/2006 | Li | | 340/539.32 |

* cited by examiner

*Primary Examiner* — Daniel Previl
(74) *Attorney, Agent, or Firm* — Invent Capture, LLC.; Samuel S. Cho

(57) ABSTRACT

A system and a method are disclosed for group search-based lost bag search and recovery. In one embodiment of the invention, the system for group search-based lost bag search and recovery includes a bag/luggage information database and a lost bag group search organizer system, which can identify and organize search groups for lost bag search and recovery based on geographic proximity of search agent devices or a common theme. In a preferred embodiment of the invention, this system is operatively connected to a plurality of devices, such as a consumer's device, a ticket agent's device, a regulatory information database, and one or more search agent devices categorized by search groups. In one example, the one or more search agent devices integrate mobile applications, which detect an electrically-identifiable bag wirelessly within a defined perimeter and report back to the lost bag group search organizer system.

12 Claims, 6 Drawing Sheets

| Bag Tag ID | Bag Owner Information | Bag Characteristic Information | Bag Location Information | Other Info |
|---|---|---|---|---|
| Sample Entry | Name, Address, and etc. | Model, Color, Bag Type, Size, and etc. | Origin, Dest., Current, Search Flag, and etc. | Misc. |
| B29384 | John Doe<br>1928 Sunbead St.<br>Orlando, Florida, USA<br>Tel: (XXX)XXX-XXXX | MT-2912; Dark Red;<br>an L-type suitcase;<br>20 in. x 15 in. x 10 in;<br>Purchased in March, 2008 | Origin: Orlando, FL.<br>Dest: LA Airport (LAX)<br>Current: Phoenix Airport (PHX)<br>Search Flag: Off | Contains Fragile Items |
| C30221 | Jane Adams<br>3012 Peakpike Ave.<br>Aurora, Co, USA<br>Tel: (XXX)XXX-XXXX | SAM-0057; Black;<br>an XL-type suitcase;<br>24 in. x 20 in. x 15 in;<br>Purchased in May, 2005 | Origin: Denver, CO.<br>Dest: Austin, TX.<br>Current: Unknown<br>Search Flag: On<br>Urgency: High | Contains fragile musical instruments |
| A90221 | Dave Chao<br>721 Redrock Blvd.<br>San Jose, CA, USA<br>Tel: (XXX)XXX-XXXX | ITR-217; Beige;<br>a sporting goods bag;<br>25 in. x 18 in. x 12 in;<br>Purchased in June, 2011 | Origin: San Jose, CA.<br>Dest: Detroit, MI<br>Current: Unknown<br>Search Flag: On<br>Urgency: Regular | Contains valuable electronic equipment for demo valued at $5,000 USD |

Information Stored in a bag / luggage information database (e.g. 105 of FIG. 1) and/or an electronic information storage and communication interface (e.g. 307 of FIG. 3 on a bag)

An example of an application map for a search-group based bag identification system

500

SYSTEM AND METHOD FOR GROUP SEARCH-BASED LOST BAG SEARCH AND RECOVERY

BACKGROUND OF THE INVENTION

The present invention generally relates to an electronically-identifiable bag and its recovery during transit. More specifically, the present invention relates to one or more systems and methods for group search-based lost bag search and recovery for an electronically-identifiable bag.

Transportation and travel industries routinely suffer from financial losses associated with lost travel bags and luggage. In the airline industry, for example, the annual losses related to lost travel bags are estimated to be over one billion US dollars. While insurance coverage on lost travel bags mitigates at least some financial damages associated with lost items during transit, permanently-lost items often result in lower customer satisfaction, a significant productivity loss, and angry emotions by travelers.

In general, there are several major causes of travel bag losses during transit in the travel industry. One cause is an erroneous destination bag tag sticker placement or an erroneous destination entry by a ticketing agent to a travel bag. For example, if numerous travelers are in line for a check-in counter, and travel bags have bunched up or placed out of order by customers or bag handlers, a destination bar code sticker or a related destination entry for a travel bag may be switched, mishandled, misplaced, or erroneously processed by the ticketing agent or other bag handlers. In this situation, the travel bag which has been mishandled, misplaced, or erroneously processed by the ticketing agent or other bag handlers is likely to be transported to an incorrect destination. Unless this travel bag has a manually-marked address label by a customer or has an identification sticker with an up-to-date traveler information, it may be difficult to search and recover the travel bag which arrived at the incorrect destination with the erroneous destination bar code bag tag sticker.

Furthermore, another cause of travel bag losses during transit in the travel industry is a destination bar code or another form of identification which is accidentally ripped apart or detached from a travel bag while being transported to an intended destination. Moreover, a baggage handler accidentally throwing a travel bag to a wrong conveyor belt or a cart in a baggage processing facility is another common cause of travel bag losses, because the travel bag placed on the wrong conveyor belt may be transported to an entirely different destination from an intended destination.

Due to a significant problem associated with travel bag losses, the travel industry has experimented with newer technologies such as radio frequency identification tags (RFID tags) to track travel bags. In theory, RFID tags can be read from a longer distance than from a bar code scanner, and each RFID tag may be able to store more information than a simple bar code-based destination sticker. Unfortunately, because many travel hubs, such as airports, train stations, hotels, and piers, do not have ubiquitous, pervasive, and standardized RFID infrastructure, the use of RFID tags alone has not been effective in reducing lost travel bags. Furthermore, the use of RFID tags has also been ineffective in search and recovery of these lost travel bags not only just because the standardized RFID infrastructure is lacking in many travel hubs, but also because most travel bags do not have easily-retrievable backup forms of identification in case of a misplaced or mishandled RFID tag.

Therefore, it may be advantageous to devise a system and/or a method which can systemically track a travel bag with an easily-retrievable and reliable form of information attached to the travel bag, regardless of human or machine error caused by a ticketing agent, a baggage handler, or a piece of transit equipment. Furthermore, it may be advantageous to disclose a system and/or a method which can organize and coordinate a lost bag search and recovery project effectively across multiple destinations and multiple individuals.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a group search-based lost bag search and recovery system is disclosed. This system comprises: a travel bag information database storing bag-identifying information categorized by bag tag identification (ID) codes, wherein the travel bag information database is configured to be executed on a CPU, a memory unit, and an information storage unit of a computer system; a lost bag group search organizer system capable of creating, categorizing, and coordinating geographic proximity-based or thematic coherence-based search groups, wherein each search group comprises one or more search agent devices grouped by geographic proximity or a thematic coherence, and wherein current locations of the one or more search agent devices are tracked by the lost bag group search organizer system; the one or more search agent devices formed into one or more search groups created by the lost bag group search organizer system, wherein each search agent device is capable of detecting an electronically-identifiable bag wirelessly, if the electronically-identifiable bag is within a wireless access range of each search agent device; and a data network operatively connected to the travel bag information database and the lost bag group search organizer system, wherein the lost bag group search organizer system receives at least some of the bag-identifying information categorized by bag tag identification (CD) codes periodically or in real-time via the data network.

In another embodiment of the invention, a method of using a group search-based lost bag search and recovery system is disclosed. This method comprises the steps of: initializing or updating information associated with an electronically-identifiable bag using a consumer's device or a ticket agent's device, wherein the information is stored in a travel bag information database and/or an electronic data storage attached to the electronically-identifiable bag; adding regulatory information and/or travel-specific information to the information associated with the electronically-identifiable bag; sharing, synchronizing, updating, and/or transmitting the information associated with the electronically-identifiable bag and other information to a lost bag group search organizer system operatively connected to the travel bag information database; processing a request to locate the electronically-identifiable bag in the lost bag group search organizer system; arranging one or more search group comprising one or more search agent devices, wherein each search group is categorized by geographic proximity or a thematic coherence determined by the lost bag group search organizer system; alerting one or more relevant search groups and one or more relevant search agent devices to find the electronically-identifiable bag; displaying and tracking location information of the one or more relevant search groups and the one or more relevant search agent devices via a mobile application synchronized by the lost bag group search organizer system;

scanning for the electronically-identifiable bag with bag-detecting functions in the one or more relevant search agent devices; and if the electronically-identifiable bag is found by the one or more relevant search agent devices, reporting current location information of the electronically-identifiable bag to the lost bag group search organizer system.

BRIEF DESCRIPTION OF DRAWINGS

FIG. 4 shows an example of information stored in a travel bag information database and/or an electronic information storage and communication interface on an electronically-identifiable bag, in accordance with an embodiment of the invention.

DETAILED DESCRIPTION

Figure 1:
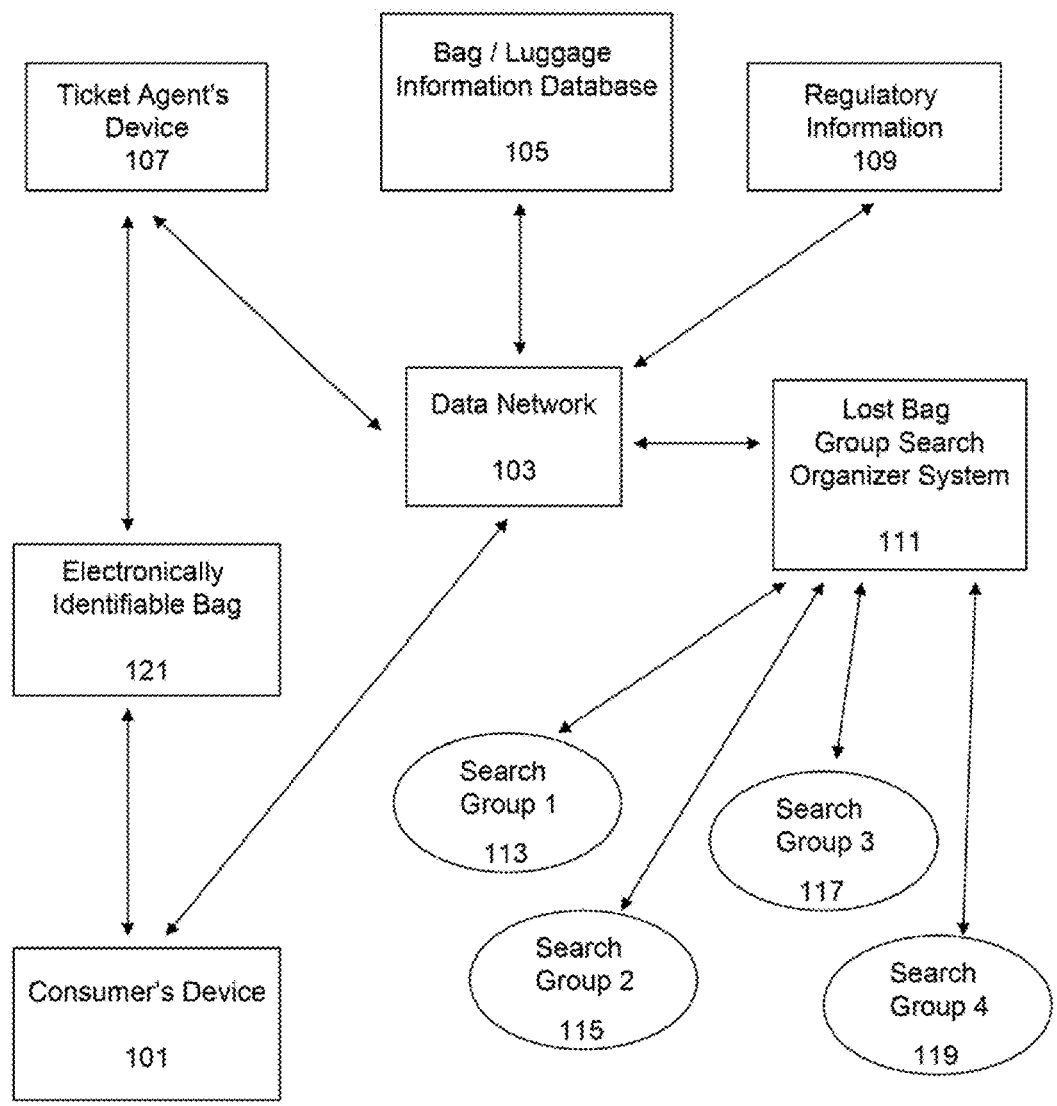
FIG. 1 shows a system diagram for group search-based lost bag search and recovery, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more systems and methods for group search-based lost bag search and recovery. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide an information technology (IT) system which can store up-to-date information associated with travel bags in an information database and organize a plurality of search groups across different areas and geographic regions via mobile applications on search agents' devices for efficient search and recovery of lost travel bags.

Another objective of an embodiment of the present invention is to provide a method of using an information technology (IT) system for group search-based lost bag search and recovery. Furthermore, another objective of an embodiment of the present invention is to provide several versions of an electronically-identifiable bag, which may be detected and accessed by a search agent device operating a bag-reader mobile application.

For the purpose of describing the invention, a term "electronically-identifiable bag" is defined as a bag, a luggage case, a container, or a movable object with an identification-related information storage, which can be accessed by another electronic device for information reading, writing, and/or updating. One example of an electronically-identifiable bag is a travel bag which embeds a non-volatile memory (e.g. Flash memory) storage and one or more wired (e.g. USB, serial port) and/or wireless (e.g. Bluetooth, IEEE 802.11 Standard-based wireless LAN, RFID, NFC, ZigBee) communication interfaces for access by another electronic device. Another example of an electronically-identifiable bag is a travel bag with an RFID tag, which may be detachable from the travel bag. In a preferred embodiment of the invention, an RFID tag attached to a travel bag, or a non-volatile memory storage attached to or embedded in the travel bag is detected and accessed by a search agent device (e.g. a smart phone), which executes a bag identification reader mobile application for accessing the electronically-identifiable bag.

Furthermore, for the purpose of describing the invention, a term "search agent device" is defined as an electronic device used by a person searching for a travel bag, wherein the electronic device is capable of detecting and accessing bag-identifying information from an electronically-identifiable bag, if the electronically-identifiable bag is within the range of access by the electronic device. An example of a search agent device is a smart phone or another handheld device, which executes a bag-reading mobile application and utilizes a wireless protocol such as Bluetooth, NFC, ZigBee, or wireless LAN (e.g. IEEE 802.11) for detection and access of information from an RFID tag or another non-volatile memory storage attached to or embedded in the electronically-identifiable bag. Alternatively, the smart phone may still execute a bag-reading mobile application, but utilizes a physical connection communication standard such as the USB or a serial port connection to communicate with the electronically-identifiable bag.

Moreover, for the purpose of describing the invention, a term "search group" is defined as an organized group of people (i.e. search agents), each of whom capable of using a search agent device for search and recovery of a lost bag. In a preferred embodiment of the invention, a search group is created, defined, organized, and managed by a lost bag group search organizer system. A creation and organization of a search group may be based on geographic proximity of search agent devices (e.g. located in the same airport, located in nearby carousels, and etc.), or a "common theme" search agent devices for intuitive categorization of search groups. Examples of using a common theme for a search group organization include, but are not limited to, categorizing search agent devices by themes (e.g. search agents specializing in expensive valuables, urgent medications, pets, and etc.) or similar events (e.g. ski seasons, music festivals, consumer electronics shows, and etc.), and placing them into search groups characterized by similar events or themes for a lost item search and a recovery project (e.g. a lost ski bag, a lost musical equipment unit, a lost consumer electronics demo unit, a traveler's lost medication, a lost pet, and etc.).

Furthermore, for the purpose of describing the invention, a term "consumer's device" is defined as an electronic device such as a computer, a smart phone, or another device which is capable of communicating with an information storage unit (e.g. an RFID tag, a non-volatile memory storage, and etc.) attached to or embedded in the electronically-identifiable bag. This communication can be achieved by using a wireless protocol in some embodiments of the invention (e.g. RFID, Bluetooth, NFC, ZigBee, or wireless LAN (e.g. IEEE 802.11)), or a physical connection (e.g. USB or serial port connection) with a corresponding cable and input/output data ports in other embodiments of the invention. In a preferred embodiment of the invention, a consumer's device is also capable of transmitting bag-related information to a bag/luggage information database via a data network.

Similarly, for the purpose of describing the invention, a term "ticket agent's device" is defined as an electronic device such as a computer, a smart phone, or another device, which is capable of communicating with an information storage unit (e.g. an RFID tag, a non-volatile memory storage, and etc.) attached to or embedded in the electronically-identifiable bag. This communication can be achieved by using a wireless protocol in some embodiments of the invention (e.g. RFID, Bluetooth, NFC, ZigBee, or wireless LAN (e.g. IEEE 802.11)), or a physical connection (e.g. USB or serial port connection) with a corresponding cable and input/output data ports in other embodiments of the invention. In a preferred embodiment of the invention, a ticket agent's device is also capable of transmitting bag-related information to a bag/luggage information database via a data network.

FIG. 1 shows an overall system diagram for a group search-based lost bag search and recovery system (100), in accordance with an embodiment of the invention. In a preferred embodiment of the invention, an electronically-identifiable bag (121) has an RFID tag or a non-volatile memory storage attached to or embedded in a surface of the bag. When the electronically-identifiable bag (121) is first purchased by a consumer, the consumer may initially or periodically update bag-identifying information to the RFID tag or the non-volatile memory storage embedded in or attached to the surface of the bag using a consumer's device (101). In the preferred embodiment of the invention, the types of information that the consumer may want to initialize or update include, but are not limited to, a bag owner's name, a bag owner's current address and contact information, and other useful information suitable for a bag owner information field (403 of FIG. 4), which is part of bag-related information that can be stored in a bag/luggage information database (105) and/or an electronic information storage embedded in or attached to the electronically-identifiable bag (121).

Examples of the consumer's device (101) include, but are not limited to, a computer, a smart phone, a dedicated portable electronic device, or another electronic device configured to communicate with the electronically-identifiable bag (121) for initialization or updates to the bag-identifying information stored in the electronically-identifiable bag (121) and/or the bag/luggage information database (105). In a preferred embodiment of the invention, the bag/luggage information database (105) is operatively connected to the consumer's device (101) via a data network (103) such as the Internet.

As shown in FIG. 4 as an example, in a preferred embodiment of the invention, numerous data fields such as a bag tag ID (401 of FIG. 4), a bag owner information field (403 of FIG. 4), a bag characteristic information field (405 of FIG. 4), a bag location information field (407 of FIG. 4), and other information (409 of FIG. 4) can be stored directly in an information storage unit of the electronically-identifiable bag (121). Furthermore, at least some of these data fields (401, 403, 405, 407, 409 of FIG. 4) may also be stored in the bag/luggage information database (105), wherein at least some of these data fields are synchronized periodically or in real-time in the bag/luggage information database (105), as updates from the consumer's device (101) or a ticket agent's device (107) to the electronically-identifiable bag (121) are initiated. In another embodiment of the invention, most of the data fields (e.g. 403, 405, 407, 409 of FIG. 4) may be dynamically updated in the bag/luggage information database (105) in association with a particular bag tag ID (401 of FIG. 4), which identifies a particular electronically-identifiable bag (121). In this embodiment of the invention, only a few data fields, if any (e.g. a bag owner information field (403 of FIG. 4)), may be desired to be updated directly in the information storage unit (e.g. an RFID tag, a non-volatile storage, and etc.) of the electronically-identifiable bag (121), while most of the other data fields associated with the electronically-identifiable bag (121) are dynamically updated in a cloud infrastructure (e.g. a bag/luggage information database (105) accessible via the Internet).

Continuing with FIG. 1, in some embodiments of the invention, a manufacturer of the electronically-identifiable bag (121) may also initialize some data fields or perimeters, such as a bag tag ID (401 of FIG. 4), a bag model name, dimensions of the bag, and other pertinent information suitable for a bag characteristic information field (405 of FIG. 4), even before a consumer purchases the electronically-identifiable bag (121). In addition, in some embodiments of the invention, it may be desirable to infuse regulatory information (109) into the initialized data fields during the data initialization stage of the electronically-identifiable bag (121). Furthermore, it may also be desirable to export bag-identifying information such as a bag tag ID (401 of FIG. 4) and a bag characteristic information data field (405 of FIG. 4) to the bag/luggage information database (105), as each electronically-identifiable bag undergoes data initialization by the manufacturer. In some instances, the data initialization of electronically-identifiable bags by the manufacturer simplifies bag registration process in the group search-based lost bag search and recovery system (100), and may also improve tracking capability of travel bags for a higher level of security preferred by local or national governments.

Furthermore, in a preferred embodiment of the invention, a ticket agent's device (107) is a computer, a smart phone, or another portable device, which can access information from the electronically-identifiable bag (121) directly using a wired or wireless protocol, or indirectly via a data network (103). In the preferred embodiment of the invention, the ticket agent's device (107) updates travel-related information in the electronically-identifiable bag (121) and/or the bag/luggage information database (105), which tracks the electronically-identifiable bag (121) via a bag tag ID. For example, the updated travel-related information from the ticket agent's device (107) may include a place of origin, a final destination, and any stopover destinations, which could be part of a bag location information data field (407 of FIG. 4). In another embodiment of the invention, both the ticket agent's device (107) or the consumer's device (101) may be used for updating at least some portions of the travel-related information and/or an itinerary.

Continuing with FIG. 1, in one embodiment of the invention, some information from a local or national government database which stores regulatory information (109), such as a bag classification code, a risk threat assessment rating based on a traveler's name, address; or background information, a destination-specific risk assessment rating, and/or another safety-related information, may be compared against information stored in the electronically-identifiable bag (121) and/or the bag/luggage information database (105) for improved travel security procedures. Moreover, in one embodiment of the invention, the bag/luggage information database (105) itself may be at least partly regulated or supervised by a government regulatory agency. in a preferred embodiment of the invention, the bag/luggage information database (105) is an electronic information depository which is implemented and executed on one or more computer systems containing one or more CPU's, memory units, and data storages. In the preferred embodiment of the invention, the bag/luggage information database (105) may primarily be a software-based implementation operating on CPU's, memory units, and data storages of one or more computer systems (e.g. computer servers) operatively connected to the data network (103).

Moreover, in a preferred embodiment of the invention, the group search-based lost bag search and recovery system (100) also includes a lost bag group search organizer system (111). In one embodiment of the invention, the lost bag group search organizer system (111) is operatively connected to the bag/luggage information database via the data network (103). In another embodiment of the invention, the lost group search organizer system (111) may be integrated into a computer system executing the bag/luggage information database (105).

In the preferred embodiment of the invention, the lost bag group search organizer system (111) comprises a lost bag group search organizer software executed on a CPU, a memory unit, and/or a data storage of a computer system, wherein the lost bag group search organizer software receives geographic and/or thematic information associated with search agent devices, and then organizes at least some search agent devices into one or more search groups (113, 115, 117, 119) for coordinating a lost bag search and recovery project based on geographic proximity or thematic coherence. In one embodiment of the invention, the creation and organization of a search group may be based on geographic proximity of search agent devices. For instance, search agent devices may be located in the same airport, located in nearby carousels, or located within a certain defined distance from each other. In another embodiment of the invention, a thematic coherence (i.e. a "common theme"), may be a motivating factor for placing certain search agent devices into a same search group. Examples of using a thematic coherence for organizing search groups include, but are not limited to, categorizing search agent devices by similar events (e.g. ski resorts, music festivals, consumer electronics shows, and etc.) or themes (e.g. search agents specializing in expensive valuables, urgent medications, pets, and etc.), and placing them into search groups characterized by similar events or themes for a lost item search and recovery project (e.g. a lost ski bag, a lost musical equipment unit, a lost consumer electronics demo unit, a traveler's lost medication, a lost pet, and etc.).

Furthermore, in the preferred embodiment of the invention, the lost bag group search organizer system (111) is also capable of instructing to and communicating with each search agent device in each search group via a wireless network (e.g. a cellular network) and a mobile application installed in each search agent device, which may be a smart phone or a dedicated portable unit.

In addition, in one embodiment of the invention, the group search-based lost bag search and recovery system (100) is capable of allowing a consumer's device (101) to access information associated with the consumer's electronically-identifiable bag (121) by using a web user interface or another user interface, which is designed to provide at least some information sharing with the consumer's device (101). For example, if the consumer's electronically-identifiable bag (121) is currently in transit, or if it is missing currently, the consumer can log into a web user interface operatively connected to the consumer's device (101) (e.g. a computer, a smart phone, another mobile device, and etc.) and the group search-based lost bag search and recovery system (100) to check the current status and whereabouts of the consumer's electronically-identifiable bag (121). Following this example, if the consumer is in San Francisco, but the electronically-identifiable bag (121) is in a transit delay from an airport in San Diego, then the consumer can log into the group search-based lost bag and search recovery system (100) with the consumer's device (101) to check the current location and the current status (e.g. missing, in transit, and etc.) of the electronically-identifiable bag (121).

Figure 2:
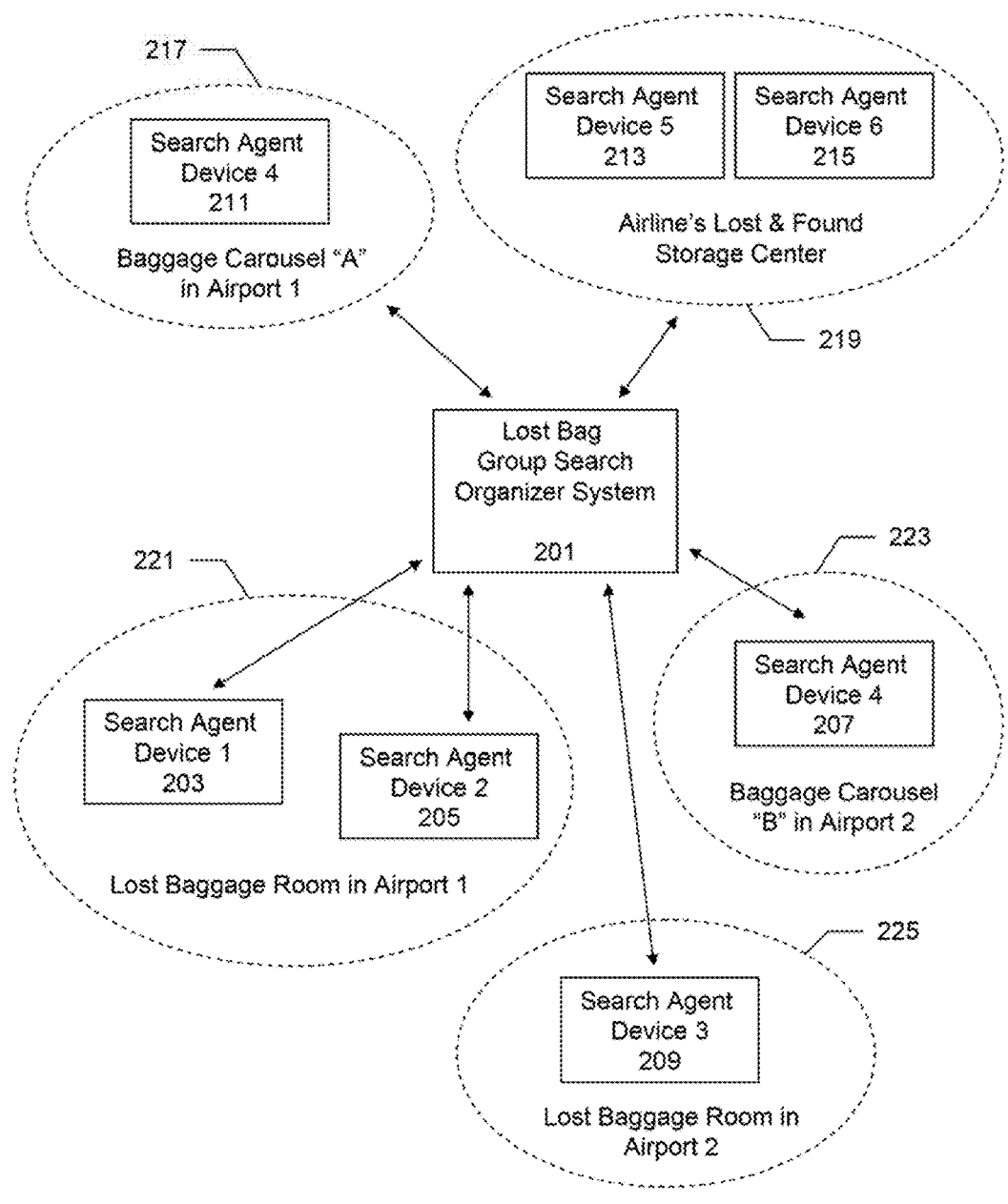
FIG. 2 shows an example of a lost bag group search organizer system configured to organize a plurality of search groups, in accordance with an embodiment of the invention.

FIG. 2 shows an example (200) of a lost bag group search organizer system (201) configured to organize a plurality of search groups (217, 219, 221, 223, 225), in accordance with an embodiment of the invention. In a preferred embodiment of the invention, a first search group (217) includes a search agent device 4 (211) for search of a lost travel bag in a baggage carousel "A" area in Airport 1 A second search group (219) comprises a search agent device 5 (213) and a search agent device 6 (215), both of which are located in an airline's lost & found storage center in the airline's corporate hub. Furthermore, a third search group (221) includes a search agent device 1 (203) and a search agent device 2 (205), both of which are located in a lost baggage room in Airport 1. In addition, a fourth search group (223) comprises a search agent device 4 (207) located in a baggage carousel "B" in Airport 2, while a fifth search group (225) includes a search agent device 3 (209) located in a lost baggage room in Airport 2.

In the example (200) shown in FIG. 2, the lost bag group search organizer system (201) created and categorized search groups (217, 219, 221, 223, 225) based on geographic proximities of search agent devices. For example, the search agent device 5 (213) and the search agent device 6 (215) are grouped together into the second search group (219) because these two search agent devices (213, 215) are located close to each other in the airline's lost & found storage center. Similarly, the search agent device 1 (203) and the search agent device 2 (205) are grouped together into the third search group (221) because these two search agent devices (203, 205) are located close to each other in the lost baggage room in Airport 1. For geographical proximity-based grouping, the lost bag group search organizer system (201) or another associated system component has a real-time tracking capability of each registered search agent device with the lost bag group search organizer system (201). Because each search agent device in the preferred embodiment of the invention is a smart phone or another mobile device capable of wirelessly communicating with the lost bag group search organizer system (201), it is desirable to utilize cellular-based and/or GPS-based location tracking technology to track a current location of each search agent device. With current location data of each registered search agent device up-to-date in the lost bag group search organizer system (201) or in another associated system component, geographic proximity-based grouping of search agent devices can be performed by a software application program operating on a CPU, a memory unit, and/or an information storage unit of a lost bag group search organizer system (201).

In another embodiment of the invention, the lost bag group search organizer system (201) may group registered search agent devices based on a thematic coherence or a common theme. In this embodiment of the invention, it is desirable for the lost bag group search organizer system (201) to associate certain themes to each search agent device. In one example, if a travel bag containing a traveler's time-sensitive medication is lost, and specialized search agents who specialize in extremely urgent item recovery in numerous transportation hubs across different states and municipalities were to be utilized, then particular search agent devices held by the specialized search agents may be associated with a thematic flag "special search agents for extremely urgent items." In this particular example, search agent devices with this thematic flag may be placed in a single group for real-time information sharing in their mobile applications, with their full-time resources dedicated to finding this particular lost travel bag. Other search agent devices without the thematic flag "special search agents for extremely urgent items" may be allowed to participate in the search and recovery effort of the lost travel bag containing the traveler's lost medication, but this mission may not have to be their full-time duty or a prioritized job requirement. For example, a search agent who is not currently flagged to search for "extremely urgent items" may have multiple job duties, such as working as a ticketing agent or a baggage handling operator, while another search agent who is flagged to search extremely urgent items may have a full-time job of searching for an extremely urgent lost item. In this example, the lost bag group search and organizer system (201) may track the flag status of each registered search agent device in real-time and take a search agent's job priority in its consideration of categorizing and organizing search groups.

In one embodiment of the invention, the lost bag group search organizer system (201) is configured to operate either in geographic proximity-based grouping mode or a thematic coherence-based grouping mode. Furthermore, in one embodiment of the invention, the lost bag group search organizer system (201) is configured to communicate (i.e. receive or transmit) updated bag-related information, search agent device-related information, and other relevant information with a bag/luggage information database (105 of FIG. 1) or another system component.

As shown by the example (200) in FIG. 2 and related descriptions above, the group search-based lost bag search and recovery system (100 of FIG. 1) with the lost bag group search organizer system (201) provides users a unique and efficient platform to create, organize, instruct, and coordinate multiple search groups in real-time based on geographic proximity or a thematic coherence of search agent devices. By utilizing a multiple agent-based group search model categorized by geographical proximity or a thematic coherence, various embodiments of the present invention provides a higher level of efficiency, effectiveness, and practical usability over any conventional travel bag management infrastructures.

Figure 3:
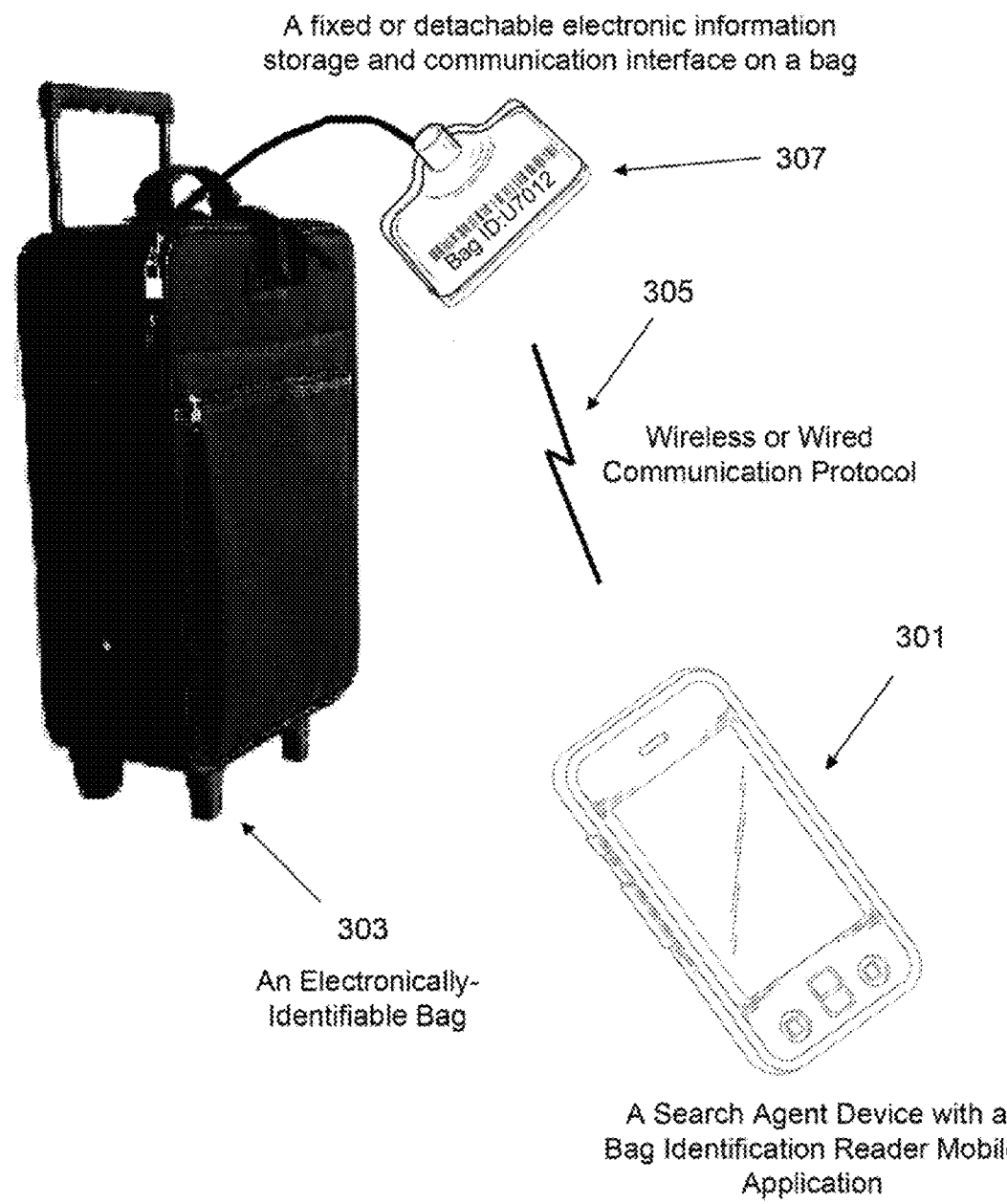
FIG. 3 shows an example of an electronically-identifiable bag with a fixed or detachable electronic information storage and communication interface which is configured to communicate with a search agent device, in accordance with an embodiment of the invention.

FIG. 3 shows an example (300) of an electronically-identifiable bag (303) with a fixed or detachable electronic information storage and communication interface (307), which is configured to communicate with a search agent device (301), in accordance with an embodiment of the invention. In a preferred embodiment of the invention, the electronically-identifiable bag (303) is embedded with an electronic information storage and communication interface (307) based on a non-volatile memory unit (e.g. Flash memory) and a wireless communication technology (305) such as Bluetooth, IEEE 802.11 wireless LAN, Near-Field Communications (NFC), ZigBee, or an RFID protocol. In another embodiment of the invention, the electronically-identifiable bag (303) is attached with an RFID tag or another easily-detachable form of electronic information storage and communication interface.

The advantage of using a detachable form of electronic information storage and communication interface (e.g. an RFID tag) may be using the detachable electronic information storage and communication interface in a variety of different travel bags a user may have. However, the detachable form (e.g. an RFID tag) also exhibits potential disadvantages over an embedded electronic information storage and communication interface in a bag, which is the inventor's preferred embodiment. In particular, for data initialization of bag characteristic information (e.g. 407 of FIG. 4) and/or a bag tag ID (e.g. 401 of FIG. 4), an RFID tag or another easily-detachable electronic information storage potentially weakens the robustness of data field contents, because the burden of data field updating and upkeep shifts heavily to a consumer, instead of a manufacturer who can initialize a good portion of data fields if the electronic information storage were embedded in a bag, and therefore, bag-specific even from a manufacturing stage. If an easily-detachable electronic information storage designed to be attached on different bags is used for an embodiment of the present invention, information update related to bag characteristics (e.g. bag dimension, size, color, model name, and etc.) may need to be largely dependent on a consumer's rigorous updating to the easily-detachable electronic information storage every time the consumer attaches it to a different travel bag, hence creating a potential out-of-sync situation with the bag/luggage information database. Furthermore, the detachable nature of an RFID tag or another easily-detachable electronic information can result in its accidental detachment from a bag, hence making search and recovery efforts less effective. In any case, it may be desirable to empower and authorize a ticket agent to update at least some portions of information update related to the bag characteristics (e.g. bag dimension, size, color, model name, and etc.)

Continuing with FIG. 3, in a preferred embodiment of the invention, a search agent device (301) is a smart phone or another portable electronic device loaded with a bag identification reader mobile application. The bag identification reader mobile application is configured to communicate with a lost bag group search organizer system (201 of FIG. 2). Furthermore, the bag identification reader mobile application operating on the search agent device (300 utilizes a wireless communication protocol (305) (e.g. Bluetooth, IEEE 802.11 wireless LAN, Near-Field Communications (NFC), ZigBee, or an RFID protocol) to detect the electronically-identifiable bag (303), if the search agent device (301) comes within a bag detection distance. In general, the bag detection distance is determined by a type of a wireless communication protocol (305) and the amount of obstacles placed between an electronically-identifiable bag and a search agent device. For example, a search agent device (e.g. 301) and an electronic information storage (e.g. 307) on an electronically-identifiable bag (303) may have a bag detection range of approximately ten meters, if Bluetooth technology is used. In another example, a search agent device (e.g. 301) and an electronic information storage (e.g. 307) on an electronically-identifiable bag (303) may have a bag detection range of approximately fifty meters, if IEEE 802.11 wireless LAN technology is used.

Therefore, in a preferred embodiment of the invention, it is desirable to use a wireless communication protocol (305), such as IEEE 802.11 wireless LAN technology, which has a longer device access range and a greater non-line-of-sight access capability. Because most of today's smart phones incorporate Bluetooth and IEEE 802.11 wireless LAN technology, an electronically-identifiable bag with a communication interface utilizing Bluetooth and/or IEEE 802.11 wireless LAN protocols is desirable for practical and cost-effective implementation of the group search-based lost bag search and recovery system, as described in various embodiments of the present invention. For practical and cost-effective implementation, it is equally desirable to have a bag identification reader mobile application to utilize Bluetooth, IEEE 802.11 wireless LAN, or other integrated standard wireless technologies already available in a smart phone, which may be readily and cost-effectively used as a search agent device (301), instead of a specialized and dedicated hardware specifically. built as a search agent device.

Yet, in some embodiments of the invention, the electronically-identifiable bag (303) may also utilize physical connection-based data transfer interfaces, such as the USB and/or serial port interfaces for communication. Therefore, in these embodiments of the invention, a search agent device (301) with a USB port or a serial port interface may utilize a physical connector cable to communicate with a fixed or detachable electronic information storage and communication interface on the bag (307).

As shown by the example (300) in FIG. 3, in one embodiment of the invention, the fixed or detachable electronic information storage and communication interface on the bag (307) may also have a surface imprint, which may comprise. a bar code, a QR code, and/or alphanumeric printed information (e.g. "Bag ID: U7012") for bar / QR-code scanning or visual identification of the electronically-identifiable bag (303).

Continuing with FIG. 3, a bag identification reader mobile application on a search agent device (301) may receive instructions for a lost bag search and recovery as well as bag identification-related information from a lost bag group search organizer system (e.g. 201 of FIG. 2), when a lost bag search and recovery project is initiated by a user request or an automated system request. Then, a search agent may begin to sweep a nearby area with the search agent device (301) for wireless detection of a lost bag (e.g. 303), which is electronically-identifiable. If the search agent device (301) detects the lost bag (e.g. 303), then the search agent device (301) can inform the lost bag group search organizer system (e.g. 201 of FIG. 2) that the lost bag is detected. Optionally, the search agent device (301) may send current location information of the found lost bag to the lost bag group search organizer system (e.g. 201 of FIG. 2). In a preferred embodiment of the invention, once the lost bag is found by a search agent device, the lost bag group search organizer system (e.g. 201 of FIG. 2) can notify the results to a user (e.g. a ticketing agent, a system operator, a bag owner, and etc.), and also conclude the lost bag search and recovery project by informing a closure of the lost bag search request to organized search groups and search agent devices.

FIG. 4 shows an example (400) of information stored in a travel bag information database (e.g. 105 of FIG. 1) and/or an electronic information storage and communication interface (e.g. 307 of FIG. 3) on an electronically-identifiable bag (e.g. 303 of FIG. 3), in accordance with an embodiment of the invention. In a preferred embodiment of the invention, the information (e.g. 401, 403, 405, 407, 409) associated with an electronically-identifiable bag may include, but are not limited to, a bag tag identification (ID) (401), a bag owner information field (403), a bag characteristic information field (405), a bag location information field (407), and other information (409). In the preferred embodiment of the invention, the bag tag ID (401) can uniquely identify an electronically-identifiable bag itself, especially if an electronic information storage is embedded in the electronically-identifiable bag. In an alternative embodiment of the invention, the bag tag ID (401) may instead represent a unique ID for a detachable electronic information storage tag (e.g. RFID tag), which is attachable to a travel bag.

Furthermore, in one embodiment of the invention, the bag owner information field (403) includes an owner's name (e.g. first, middle, last, nickname, and etc.), an owner's address (e.g. home address, business address, destination address, and etc.), an email address, a telephone number, and any other owner or traveler-specific information useful for identifying and contacting the owner or another related traveler. The bag owner information field (403) may be updated by a consumer's device (e.g. 101 of FIG. 1), a ticket agent's device (e.g. 107 of FIG. 1), or any other authorized personnel who has permission to change the bag owner information data field (403) for a group search-based lost bag search and recovery system (e.g. 100 of FIG. 1).

Continuing with FIG. 4, in one embodiment of the invention, the bag characteristic information field (405) includes a model name, color, bag type, dimensions, and other information related to the bag's properties. As shown by the first entry with the bag tag ID of "B29384" in the example (400) of information stored in a travel bag information database and/or an electronic information storage and communication interface on an electronically-identifiable bag, the first entry has "MT-2912" as a model name, "Dark Red" as color, a "Large-type suitcase" as a bag type, and "20 in.×15 in.×10 in" as length, width, and height dimension for this travel bag. Furthermore, in one embodiment of the invention, other information related to the bag's properties, such as the purchase date of the bag by the current owner, may be listed under the bag characteristic information field (405).

In a preferred embodiment of the invention, most entries, if not all, of the bag characteristic information field (405) may be initialized by a bag manufacturer even before it is purchased by a consumer (i.e. a bag owner), and then be subject to updates by a consumer's device, a ticket agent's device, or another authorized device operatively connected to a group search-based lost bag search and recovery system. In another embodiment of the invention, the bag characteristic information field (405) may be both initialized and updated by the consumer's device, the ticket agent's device, and/or another authorized device.

Moreover, in one embodiment of the invention, the bag location information field (407) may contain information related to a place of departure (i.e. origin), a destination, a current location, and search flags. As shown by the first entry in the example (400) in FIG. 4, for a travel bag associated with the bag tag ID "B29384," the place of departure is Orlando, and the destination is LA Airport (LAX). For this example, the bag location information field (407) also shows that the current location of the travel bag is Phoenix Airport. In addition, in one embodiment of the invention, a search flag may indicate whether a search project is needed or is currently underway. For example, if the search flag is "on," as shown by a travel bag with the bag tag ID "C30221" in the example (400), then a lost bag group search organizer system (e.g. 111 of FIG. 1) may be conducting a search and recovery project with organized search groups for the travel bag with the bag tag ID "C30221." Similarly, the lost bag group search organizer system (e.g. 111 of FIG. 1) may also be conducting another search and recovery project with organized search groups for the travel bag with the bag tag ID "A90221," because the search flag is also "on" for this particular travel bag. On the other hand, if the search flag is "off," for a particular bag tag ID, as in the case of the bag tag ID "B29384," then the lost bag group search organizer system (e.g. 111 of FIG. 1) may not be conducting any search and recovery project for the travel bag associated with this bag tag ID.

Furthermore, in one embodiment of the invention, an optional "urgency" flag may indicate a special condition related to a Bag Tag ID. For example, the urgency flag may be set to "high," which indicates an urgent need for immediate search, whereas the urgent flag set to "regular" indicates a typical search speed requirement for a search and recovery project coordinated by the lost bag group search organizer system (e.g. 111 of FIG. 1). In one embodiment of the invention, the urgency flag may also be used for categorizing search agent devices. For example, a travel bag with the search flag set "on" and the urgency flag set "high" may prompt the lost bag group search organizer system (e.g. 111 of FIG. 1) to utilize a specialized group of full-time search agents for speedy search and recovery of time-sensitive or very urgent items, such as a traveler's medication or other items in a lost travel bag, which requires immediate use by a traveler or a bag owner.

In addition, in one embodiment of the invention, other information (409), such as specific descriptions of contents in a travel bag, travel-related itinerary data, and/or a bag delivery instruction from a bag owner in case of loss and recovery, may be part of the information stored in a travel bag information database (e.g. 105 of FIG. 1) and/or an electronic information storage and communication interface (e.g. 307 of FIG. 3) on an electronically-identifiable bag (e.g. 303 of FIG. 3).

Figure 5:
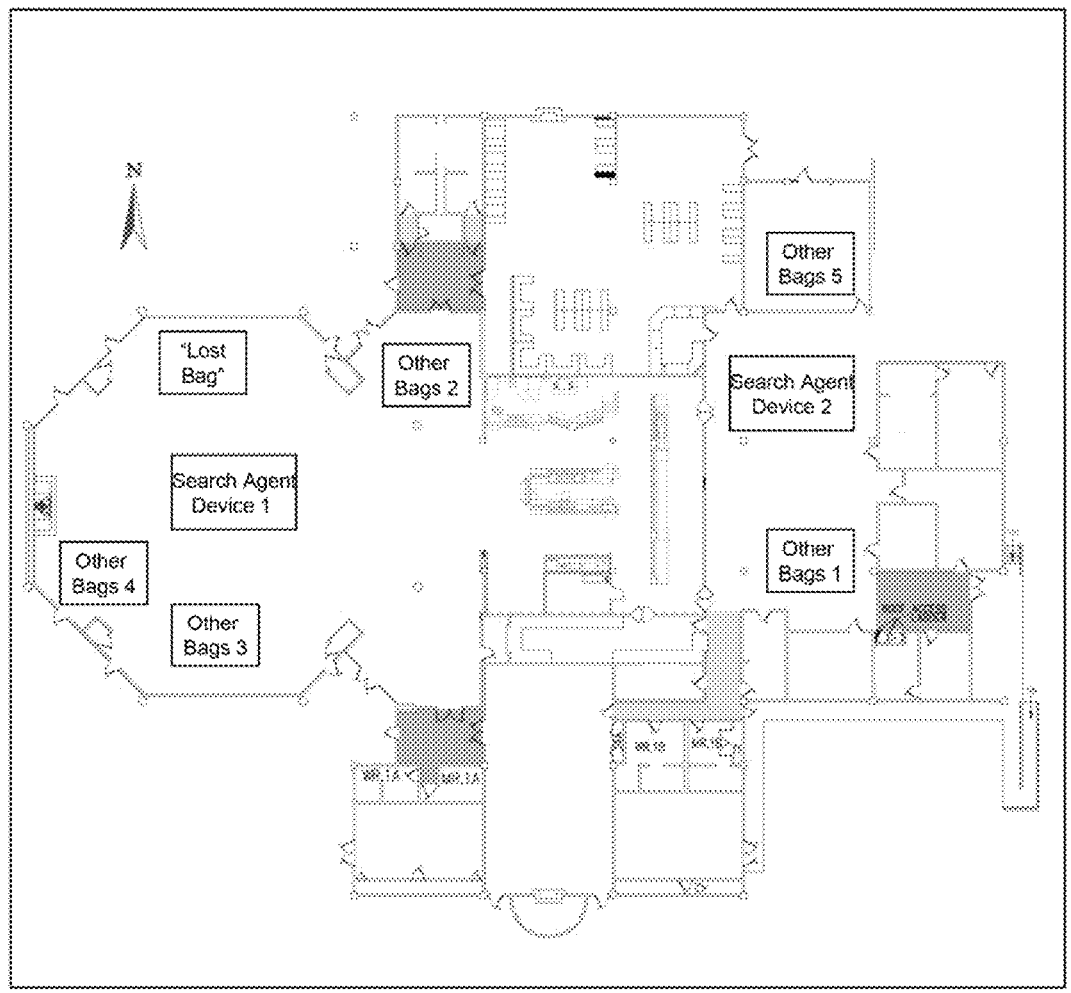
FIG. 5 shows an example of an application map for a group search-based lost bag search and recovery system, in accordance with an embodiment of the invention.

FIG. 5 shows an example of an application map (500) for a group search-based lost bag search and recovery system, in accordance with an embodiment of the invention. In a preferred embodiment of the invention, a lost bag group search organizer system (e.g. 111 of FIG. 1) is operatively connected to a travel bag information database (e.g. 105 of FIG. 1) as part of the group search-based lost bag search and recovery system (e.g. 100 of FIG. 1). When a lost bag search and recovery project is initiated either by a system user or by an automated trigger within the group search-based lost bag search and recovery system, information associated with a lost bag, such as a bag tag ID (e.g. 401 of FIG. 4), a bag owner information field (e.g. 403 of FIG. 4), a bag characteristic information field (e.g. 405 of FIG. 4), a bag location information field (e.g. 407 of FIG. 4), and other pertinent information (e.g. 409 of FIG. 4) are retrieved, accessed, and/or transmitted by the lost bag group search organizer system from the travel bag information database.

Furthermore, in the preferred embodiment of the invention, the lost bag group search organizer system also has current location information of search agent devices, which are registered with the lost bag group search organizer system. In one example, a registration process of a search agent device involves transmitting a search agent device-specific identifying code, a subscriber identity module (SIM) card information, and/or another piece of identifying information of the search agent device to the lost bag group search organizer system. Then, with an additional authentication and authorization procedure between the search agent device and the lost bag group search organizer system, the search agent device can be registered with the lost bag group search organizer system, and the current location of the search agent device may be periodically, continuously, and/or dynamically tracked by the lost bag group search organizer system.

Continuing with FIG. 5, once the lost bag search and recovery project is initiated, the lost bag group search organizer system creates, organizes, and/or coordinates registered search agent devices into one or more search groups, and transmit the lost bag-related information to a mobile application program loaded on each search agent device, which is determined to be a member of the one or more search groups. Then, in a preferred embodiment of the invention, as shown by the application map (500), current locations of at least some search agent devices (e.g. "Search Agent Device 1", "Search Agent Device 2") can be displayed on the application map (500), along with any electronically-readable or electronically-identifiable bags (e.g. "Other Bags 1," "Other Bags 2," . . . ."Other Bags 5") by the search agent devices locally displayed on the application map (500). In this particular example, the current positions of search agent devices (e.g. "Search Agent Device 1", "Search Agent Device 2") and recognized bags (e.g. "Other Bags 1," "Other Bags 2," . . . "Other Bags 5") by the search agent devices can be visualized by the application map (500), which is provided by the mobile application executed by a CPU and a memory unit of relevant search agent devices, wherein the mobile application periodically, continuously, and/or dynamically communicates information with the lost bag group search organizer system. The graphical map-based visualization of current positions each search agent device and recognized bags may help a search group to seek and recover a particular lost bag more effectively, especially if the search group is formed based on geographic proximity (e.g. a localized search group with search agents positioned nearby). Furthermore, the graphical map-based visualization as shown by the example in FIG. 5 can eliminate search redundancy and boost operational efficiency of a lost bag search and recovery project. However, in another embodiment of the invention, a mobile application for a search agent device may not generate a graphical map-based visualization and instead display primarily textual information related to the lost bag search and recovery project.

As shown by FIG. 5, if the graphical map-based visualization is used for a search group in one embodiment of the invention, the lost bag's current location information may be transmitted to the lost bag group search organizer system, once and if a lost bag to be recovered (e.g. "Lost Bag" on the application map (500)) is detected by a search agent device. Furthermore, the lost bag's current location information may also be displayed on one or more relevant search agent devices, as shown by the "lost bag" element in the application map (500). Typically, the detection of a lost bag by a search agent device is achieved by a wireless detection of the lost bag (i.e. which is electronically-identifiable), when the search agent device comes within a device or tag detection range defined by a particular wireless protocol (e.g. Bluetooth, IEEE 802.11 Standard-based wireless LAN, NFC, ZigBee, and etc.). In most instances, a search agent device may be carried by a search agent, whose full-time or part-time job responsibility is finding a lost travel bag. However, in some other instances, a search agent device may be a stationary unit attached to a ceiling, a wall, a baggage processing facility, a baggage transport system, a lost & found room, or another fixed structure.

Figure 6:
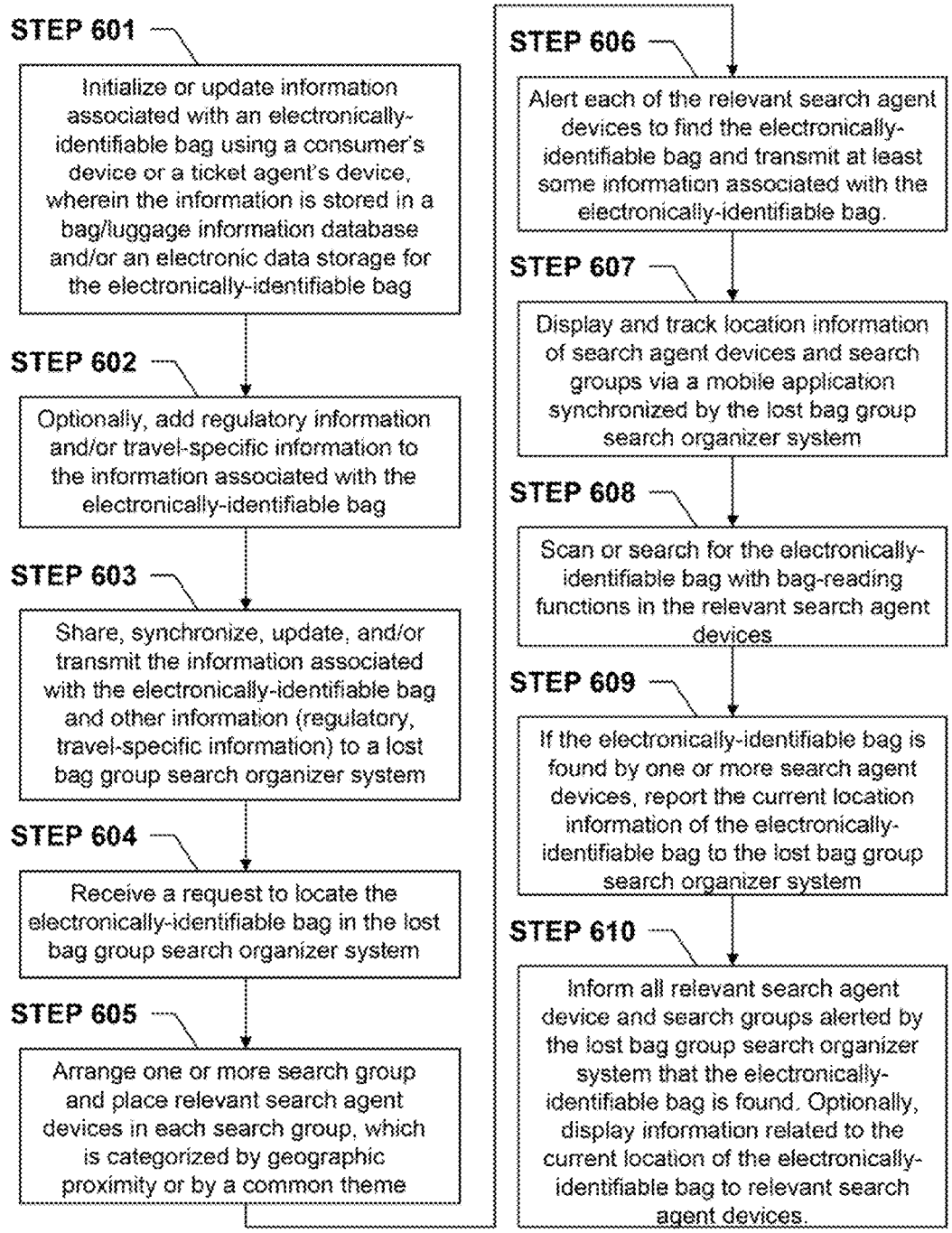
FIG. 6 shows a flowchart for a method of group search-based lost bag search and recovery using a travel bag information database, a lost bag group search organizer system, and other system components, in accordance with an embodiment of the invention.

FIG. 6 shows a flowchart (600) for a method of using a group search-based lost bag search and recovery system, which comprises a travel bag information database, a lost bag group search organizer system, and other system components, in accordance with an embodiment of the invention. In a preferred embodiment of the invention, a user initializes and/or updates information associated with an electronically-identifiable bag using a consumer's device or a ticket agent's device, wherein the information is stored in a travel bag information database and/or an electronic data storage for the electronically-identifiable bag, as shown in STEP 601. Typically, the user may be a bag owner, an associated traveler, a ticketing agent, or another authorized personnel who has access to a user interface operating in association with the consumer's device, the ticket agent's device, or another electronic device. Then, as an optional step, regulatory information and/or travel-specific information can be added to the information associated with the electronically-identifiable bag, as shown in STEP 602. In a preferred embodiment of the invention, this information set may include at least some data fields (401, 403, 405, 407, 409) of FIG. 4.

Then, the travel bag information database can share, synchronize, update, and/or transmit the information associated with the electronically-identifiable bag and other information (i.e. regulatory, travel-specific information) to the lost bag group search organizer system, as shown in STEP 603. Subsequently, when the lost bag group search organizer system receives a request from a user or from an automated alert to locate the electronically-identifiable bag, as shown in STEP 604, then the lost bag group search can organize one or more search groups and place relevant search agent devices in each search group, which is categorized by geographic proximity or by a common theme, as shown in STEP 605.

Continuing with FIG. 6, the lost bag group search organizer system then alerts each of the relevant search agent devices to find the electronically-identifiable bag and transmit at least some information associated with the electronically-identifiable bag, as shown in STEP 606. The lost bag group search organizer system is able to optionally display and track location information of search agent devices and search groups via a mobile application synchronized by the lost bag group search organizer system, as shown in STEP 607. In one embodiment of the invention, once search agents start sweeping surrounding areas with the relevant search agent devices capable of bag detection as shown in STEP 608, if the electronically-identifiable bag is found by a search agent device, then that search agent device reports the current location information of the electronically-identifiable bag to the lost bag group search organizer system, as shown in STEP 609. Then, the lost bag group search organizer system may inform all relevant search agent devices in search groups that the electronically-identifiable bag is now found, as shown in STEP 610. Furthermore, the current location of the recovered electronically-identifiable bag may be disclosed to at least some search agent devices, as also shown in STEP 610.

One or more novel systems and methods for group search-based lost bag search and recovery have been disclosed in the descriptions above and corresponding drawings. Various embodiments of the present invention exhibit several advantages over conventional methods of searching for a lost travel bag. For example, the group search-based lost bag search and recovery system with the lost bag group search organizer system provides users a unique, novel, and efficient platform to create, organize, instruct, and coordinate multiple search groups in real-time based on geographic proximity or a thematic coherence of search agent devices. By utilizing a multiple agent-based group search model categorized by geographical proximity or a thematic coherence, various embodiments of the present invention provide a higher level of efficiency, effectiveness, and practical usability over conventional travel bag management infrastructures or methods.

Furthermore, in one or more embodiments of the invention, by providing a data-networked environment among an electronically-identifiable bag, a consumer's device, a ticket agent's device, a travel bag information database, a lost bag group search organizer system, and a plurality of search agent devices belonging to a plurality of search groups, the present invention provides a unique and novel integrated travel bag search-and-recovery platform that enables seamless yet controlled information access and sharing among consumers, ticket agents, search groups, and search agents using their own favored electronic devices and user interfaces.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A group search-based lost bag search and recovery system, the system comprising:
   a travel bag information database storing bag-identifying information categorized by bag tag identification (ID) codes, wherein the travel bag information database is configured to be executed on a CPU, a memory unit, and an information storage unit of a computer system;
   a lost bag group search organizer system creating, categorizing, and coordinating geographic proximity-based and thematic coherence-based search groups, wherein each search group comprises one or more persons carrying search agent devices, and wherein current locations of the one or more search agent devices are tracked by the lost bag group search organizer system;
   the one or more search agent devices assigned to the geographic proximity-based and thematic coherence-based search groups created by the lost bag group search organizer system, wherein each search agent device detects an electronically-identifiable bag wirelessly, if the electronically-identifiable bag is within a wireless access range of each search agent device; and
   a data network operatively connected to the travel bag information database and the lost bag group search organizer system, wherein the lost bag group search organizer system receives at least some of the bag-identifying information categorized by bag tag identification (ID) codes periodically or in real-time via the data network.

2. The system of claim 1, further comprising a ticket agent's device configured to initialize or update bag-identifying information in the electronically-identifiable bag and the travel bag information database.

3. The system of claim 1, further comprising a regulatory information database which can transmit at least some regulatory information to the travel bag information database to infuse at least some regulatory information with the bag-identifying information categorized by the bag tag identification (ID) codes.

4. The system of claim 1, further comprising a consumer's device configured to initialize or update bag-identifying information in the electronically-identifiable bag and the travel bag information database.

5. The system of claim 1, further comprising a mobile application program executed by a CPU and a memory unit in each search agent device for detecting the electronically-identifiable bag wirelessly and for informing bag search-related results to the lost bag group search organizer system.

6. The system of claim 1, wherein the lost bag group search organizer system and a search agent device can generate and display an application map, which indicates current locations of search agent devices in a same group and current locations of at least some electronically-identifiable bags nearby.

7. The system of claim 1, wherein the electronically-identifiable bag has an electronic information storage and communication interface for storage and communication of a particular bag tag identification (ID) code.

8. The system of claim 7, wherein the travel bag information database or the electronic information storage and communication interface on the electronically-identifiable bag further contains information related to bag owner information, bag characteristic information, and bag location information.

9. The system of claim 7, wherein the electronic information storage and communication interface is an RFID tag or a Flash memory-based storage with a wireless communication interface, wherein the wireless communication interface is compatible with at least one of Bluetooth, IEEE 802.11 Standard-based wireless LAN, NFC, and ZigBee.

10. The system of claim 9, wherein the electronic information storage and communication interface further includes a physical connection-based communication interface compatible with a USB port standard or a serial port standard.

11. A method of using a group search-based lost bag search and recovery system, the method comprising the steps of:
  initializing or updating information associated with an electronically-identifiable bag using a consumer's device or a ticket agent's device, wherein the information is stored in a travel bag information database and/or an electronic data storage attached to the electronically-identifiable bag;
  adding regulatory information and/or travel-specific information to the information associated with the electronically-identifiable bag;
  sharing, synchronizing, updating, and/or transmitting the information associated with the electronically-identifiable bag and other information to a lost bag group search organizer system operatively connected to the travel bag information database;
  processing a request to locate the electronically-identifiable bag in the lost bag group search organizer system;
  arranging one or more search groups comprising one or more persons carrying one or more search agent devices, wherein each search group is categorized by geographic proximity and a thematic coherence determined by the lost bag group search organizer system;
  alerting one or more relevant search groups who carry one or more relevant search agent devices to find the electronically-identifiable bag;
  displaying and tracking location information for the one or more relevant search groups on the one or more relevant search agent devices carried by the one or more persons via a mobile application synchronized by the lost bag group search organizer system;
  scanning for the electronically-identifiable bag with bag-detecting functions in the one or more relevant search agent devices; and
  if the electronically-identifiable bag is found by the one or more relevant search agent devices carried by at least one person in the one or more relevant search groups, reporting current location information of the electronically-identifiable bag to the lost bag group search organizer system.

12. The method of claim 11, further comprising a step of informing all relevant search groups and all relevant search agent devices to halt a current search activity for the electronically-identifiable bag, if the electronically-identifiable bag is found by the one or more relevant search agent devices and if the current location information of the electronically-identifiable bag is reported to the lost bag group search organizer system.

\* \* \* \* \*